United States Patent [19]
Strasser et al.

[11] Patent Number: 5,717,798
[45] Date of Patent: Feb. 10, 1998

[54] OPTICAL WAVEGUIDE SYSTEM COMPRISING A MODE COUPLING GRATING AND A MODE DISCRIMINATION COUPLER

[75] Inventors: Thomas A. Strasser, Chatham; Ashish Madhukar Vengsarkar, Berkeley Heights; Kenneth Lee Walker, New Providence, all of N.J.

[73] Assignee: Lucent Technologies Inc., Murray Hill, N.J.

[21] Appl. No.: 712,697

[22] Filed: Sep. 12, 1996

[51] Int. Cl.⁶ .................................................. G02B 6/26
[52] U.S. Cl. ........................... 385/37; 385/24; 385/29
[58] Field of Search ................................. 385/371, 291, 385/24, 27

[56] References Cited

U.S. PATENT DOCUMENTS

| 4,828,350 | 5/1989 | Kim et al. ........................ 350/96.15 |
| 4,986,624 | 1/1991 | Sorin et al. ...................... 350/96.19 |
| 5,216,739 | 6/1993 | Hill et al. ........................... 385/123 |
| 5,473,714 | 12/1995 | Vengsarkar ........................... 385/29 |

OTHER PUBLICATIONS

"Calculation of Modes in an Optical Fiber Using the Finite Element Method and EISPACK", by T.A. Lenahan, *Bell System Technical Journal*, vol. 62, No. 9, Part 1, Nov. 1983, pp. 2663–2694.

*Primary Examiner*—John Ngo
*Attorney, Agent, or Firm*—Eugen E. Pacher

[57] ABSTRACT

The optical waveguide system comprises a mode discriminating coupler and reflective mode coupling means. These components can be combined in a variety of ways to perform a variety of functions. Among them are drop multiplex devices, add multiplex devices, add/drop multiplex devices, and power combiners. The device combinations can have low loss as well as high reliability, the latter due to the robust structure of the devices.

13 Claims, 3 Drawing Sheets pass straight through, but which couples higher order mode ($LP_{11}$) radiation from one fiber of the mode selector to the other. Herein we will refer to such a component as a "mode discriminating coupler" or "MDC".

The mode selector is described throughout '350 as comprising a single mode fiber and a multimode fiber. However, at column 12, lines 1–4 of '350 it is stated, without elaboration, that the mode selector could comprise two dissimilar multimode fibers.

The combination of FIG. 11 of '350 also comprises a "grating reflector" 820 that serves to reflect fundamental mode ($LP_{01}$) radiation of a given wavelength (e.g., $\lambda_1$) as higher order mode (e.g., $LP_{11}$) radiation, while transmitting the other wavelengths. The grating reflector 820 is described in U.S. Pat. No. 4,986,624.

According to our present understanding, the grating reflector 820 typically is not suitable for efficient coupling of an even and an odd mode (e.g., $LP_{01}$ and $LP_{11}$) at a given wavelength $\lambda_i$ because of its polarization dependence and limited control of grating modulation (reflector width), and because it is not an integrated structure and therefore typically lacks reliability.

U.S. Pat. No. 5,216,739 discloses blazed transmissive (long period) gratings ("mode converters") that are suitable for transforming incident $LP_{01}$ radiation into transmitted $LP_{11}$ radiation. However, the mode converter of the '739 patent has, according to the inventors, a "complex" spectral response. Such a response will typically drastically limit the usefulness of such a device, as will be apparent to those skilled in the art.

The above referenced patent application by T. A. Strasser discloses a reflective MCG that can efficiently couple the symmetrical fundamental spatial mode (e.g., $LP_{01}$) and a higher order spatial mode (e.g., $LP_{11}$) of radiation of a given wavelength $\lambda_i$, substantially without unwanted coupling (typically reflection of fundamental mode radiation) at any second wavelength near the first wavelength. Such MCGs are used in preferred embodiments of the instant invention.

OPTICAL WAVEGUIDE SYSTEM COMPRISING A MODE COUPLING GRATING AND A MODE DISCRIMINATION COUPLER

RELATED APPLICATIONS

This application is related to concurrently filed co-assigned U.S. patent application Ser. No. 08/712,694 by T. A. Strasser, entitled "Mode Coupling Optical Waveguide Grating", incorporated herein by reference.

1. Field of the Invention

This invention pertains to optical waveguide systems that comprise a mode coupling grating (MCG) and a mode discriminating coupler (MDC), for instance, in an add/drop multiplexing device, or in a power combiner.

2. Background of the Invention

In a wavelength division multiplexer (WDM) optical fiber communication system, an optical fiber simultaneously carries many different communication channels in light of respectively different wavelengths. In the use of such systems it is frequently required to add a channel onto the fiber and/or to selectively remove a channel from the fiber. Both functions are usually performed at a plurality of locations along the transmission path, commonly known as access points or nodes. Channels are added for transmission and removed at the destination.

One approach to add/drop multiplexing uses bulk optical components. Incoming wavelengths within a common fiber are spatially separated by a diffraction grating and coupled to separate output fibers. This technique, however, is expensive and requires precise mechanical alignment because of the need to couple light from free-space into optical fibers. The expense and alignment problems increase with the number of wavelength channels.

A conventional fiber coupler with a reflective refractive index grating in one arm can serve as a drop device. However, the device would inherently have >6 db loss, and thus is typically not acceptable.

A device comprising two conventional fiber couplers in series, with two precisely matched gratings between the couplers, can in principle function as a low loss drop device. However, the requirements on such a (balanced Mach-Zehnder type) device are so stringent that the device can practically only be embodied in planar waveguides on a common platform, and such a device is very difficult to produce.

Finally, a low loss drop device having a refractive index grating written in the central section of a fused coupler with a long interaction region has recently been proposed. Such a device would be difficult to manufacture reproducibly.

Accordingly, there is need for relatively inexpensive, robust, low loss waveguide devices for passive add/drop multiplexing and for other functions. This application discloses such devices.

U.S. Pat. No. 4,828,350 ('350) discloses, for instance at FIG. 11 and associated text (columns 13–15), a device combination that is said to separate light of a particular wavelength, e.g., $\lambda_1$, from light at wavelengths $\lambda_1, \lambda_2, \ldots \lambda_N$. As described, the combination appears suited to perform the drop function in a WDM optical fiber communication system. However, the prior art combination has shortcomings, which will be discussed below.

The combination of '350 comprises a "mode selector" 812, which allows fundamental mode ($LP_{01}$) radiation to

GLOSSARY AND DEFINITIONS

The spatial modes of the electromagnetic field in an optical waveguide will herein be designated in the conventional manner. For instance, the spatial modes in a conventional optical fiber will be designated $LP_{01}, LP_{11}, LP_{02} \ldots$, with $LP_{01}$ being the (symmetric, also referred to as "even") fundamental mode, $LP_{11}$ the (antisymmetric, also referred to as "odd") first higher order mode, etc.

The modes in waveguides other than (circularly symmetric) optical fibers (e.g., in planar waveguides) will also be designated in conventional manner.

For ease of exposition, the $LP_{01}$ mode will be designated "(0,1)", the $LP_{11}$ mode will be designated "(1,1)", and in general the $LP_{m,n}$ mode ($m \geq 0$, $n \geq 1$) will be designated "(m,n)".

The electromagnetic radiation of interest herein will frequently be referred to as "light", although the radiation typically is infrared radiation. This is for ease of exposition only, and does not imply any wavelength restriction.

By "optimal coupling" between two spatial modes, e.g., (0,1) and (m,n) at a given wavelength (e.g., $\lambda_i$), herein is meant the maximum possible amount of coupling between the two modes for a given periodic index modulation of the grating.

SUMMARY OF THE INVENTION

In a broad aspect the invention is embodied in an optical waveguide system that comprises an improved MDC and a reflective MCG. Although these components may be advantageously incorporated into an optical waveguide system that operates with light of only a single wavelength, the components are expected to find most advantageous use in multiwavelength systems, e.g., WDM systems, or systems that comprise two or more pump radiation sources of different wavelengths.

More specifically, the invention is embodied in an optical waveguide (typically but not necessarily an optical fiber) system that comprises a source of light of wavelength $\lambda_i$. The system further comprises utilization means of said light of wavelengths $\lambda_i$, and an optical waveguide path that optically connects said source to said utilization means. The waveguide path comprises a device combination, disposed between the source and the utilization means, that comprises an MDC and reflective mode coupling means.

Significantly, the MDC is a 4-port coupler that comprises a first multimode optical waveguide, evanescent field-coupled to a second multimode optical waveguide, with the evanescent field coupling selected such that light of wavelength $\lambda_i$ in a fundamental spatial mode that enters the MDC in one of said multimode optical waveguides propagates through the MDC in said one multimode optical waveguide, and light of wavelength $\lambda_i$ in a higher order spatial mode that enters the MDC on said one multimode optical waveguide is coupled in the MDC into the other of said multimode optical waveguides.

Furthermore, the reflective mode coupling means comprise a multimode optical waveguide, with a blazed refractive index grating of pitch $\Lambda<1$ µm and blaze angle $\theta>3°$. $\Lambda$ and $\theta$ furthermore are selected such that the grating reflects light of wavelength $\lambda_i$ in the fundamental spatial mode as light in the higher order spatial mode, and still furthermore selected such that said grating does substantially not reflect light of any wavelength $\lambda_j$, where both $\lambda_i$ and $\lambda_j$ are within a spectral range $\Delta\lambda \leq 10$ nm (more generally, within about $\lambda_i/100$).

Exemplarily, $\lambda_i$ and $\lambda_j$ correspond to different channels in a WDM optical fiber communication system, or $\lambda_i$ and $\lambda_j$ are different pump wavelengths for an optical fiber amplifier or laser. If the optical waveguide system is an optical fiber system (with the fiber having circularly symmetric cross section), then the fundamental mode is $LP_{01}$, designated herein (0,1), and the higher order mode is typically (but not necessarily) $LP_{11}$, designated herein (1,1).

The invention will be further described below in terms appropriate for a particular type of optical waveguide, namely, optical fiber. However, those skilled in the art will recognize that the invention is not limited to optical fiber, but can readily be embodied in other guiding structures, e.g., in planar waveguides having substantially rectangular core cross section. Such waveguides typically have optical properties that are polarization dependent (i.e., dependent on the orientation of the electric field vector). Such a waveguide has a fundamental mode that is symmetric (designated $TX_{00}$, where X=E or M, depending on polarization), as well as higher order modes ($TE_{00}$ or $TM_{01}$, for example). Our invention is directly applicable to such a waveguide structure, as the problems and solutions for mode conversion in such a waveguide structure are substantially the same as in the optical fiber case, described in detail below.

BRIEF DESCRIPTION OF THE DRAWINGS

The same numeral is generally used to designate the same or corresponding feature in different figures.

DETAILED DESCRIPTION OF EXEMPLARY EMBODIMENTS

Figure 1:
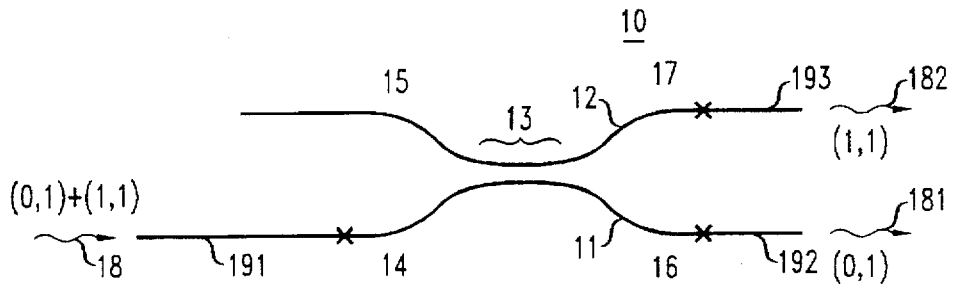
FIG. 1 schematically shows an exemplary mode discriminating coupler (MDC)

FIG. 1 schematically shows an exemplary MDC that differs from the mode selector of '350 with respect to the optical fibers, with the fibers in MDC 10 being dissimilar multimode fibers, typically dual mode fibers. Reference numerals 11–17 refer, respectively, to the first fiber, second fiber, coupling region, and first, second, third and fourth coupler ports. Numerals 191–193 refer to conventional optical fibers light-transmissively joined in conventional fashion (e.g., fusion spliced) to coupler ports 14, 16 and 17, as indicated in conventional fashion by "x". Fibers 191 and 193 are multimode (typically dual mode) fibers, and fiber 192 is a single mode fiber. Numeral 18 refers to the input radiation, exemplarily WDM radiation of wavelengths $\lambda_1, \lambda_2, \ldots \lambda_N$, with at least one of the N channels (exemplarily the $\lambda_1$ channel) comprising, in addition to the conventional fundamental mode (0,1), a higher order mode, e.g., (1,1). In the coupling region, $\lambda_1$ radiation is divided according to the spatial mode, with (1,1) radiation coupled into fiber 12 and propagating towards fourth coupler port 17, and $\lambda_1$ (0,1) radiation, together with $\lambda_2 \ldots \lambda_N$ (0,1) radiation, continuing in fiber 11 towards third coupler port 16. The MDC thus separates radiation in a higher order mode from radiation in the fundamental mode. It will be understood that, if all $\lambda_1$ radiation at first port 14 is in the $LP_{11}$ spatial mode, essentially all $\lambda_1$ radiation would appear at 4th port 17.

Figure 2:
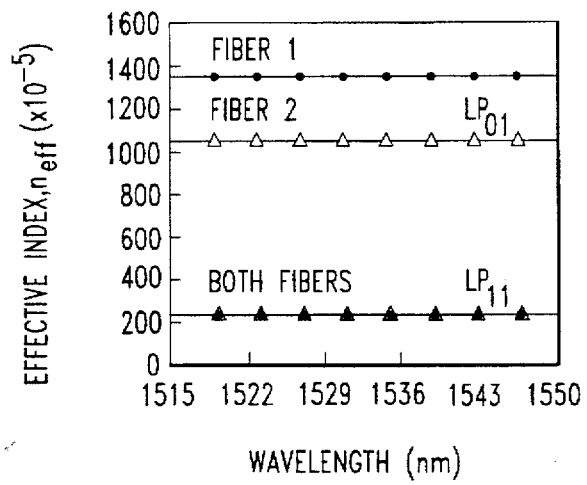
FIG. 2 shows effective refractive index vs. wavelength for two exemplary fibers useful for making an MDC.

A coupler having the above described mode discrimination property can be designed and made using a phase matching scheme. The scheme exemplarily involves choice of two multimode fibers such that the propagation constants $\beta_{01}$ of the (0,1) modes are disparate in the two fibers, and such that the propagation constants $\beta_{11}$ of the exemplary higher order mode (or modes) are essentially identical in the two fibers. This condition is met, exemplarily, for $\lambda \sim 1.53$ µm, if one of the fibers has a 6.25 µm diameter graded index core, with profile parameter $\alpha=5$, and with $\Delta=1.636\%$, and if the other fiber has a step index core, of the same diameter, with $\Delta=1.2\%$. FIG. 2 shows the computed effective refractive indices for the (0,1) and (1,1) modes of two such fibers as a function of wavelength. Knowing the effective refractive index of a given mode (m,n) at a given wavelength $\lambda$, the propagation constant of the mode can be readily determined by means of the well known relationship $\beta_{mn}=(2\pi n_{\it{eff}})/\lambda$, where $n_{\it{eff}}$ is the effective refractive index of the (m,n) mode.

The above described phase matching scheme differs from the scheme of the '350 patent, which requires a single mode fiber and a multimode fiber, with $\beta_{01}$ of the former being equal to $\beta_{11}$ of the latter, and with $\beta_{01}$ of the former being substantially different from $\beta_{01}$ of the latter.

The effective refractive index of a given mode in a fiber of a given refractive index distribution can be readily computed by means of a known algorithm. See T. Lenahan, *Bell System Technical Journal*, Vol. 62, p. 2663 (1983). As those skilled in the art will understand, the process can be inverted, and a refractive index profile that provides the desired propagation constants can be determined. An optical fiber having the desired refractive index profile can then be prepared by a known technique, e.g., by MCVD. Once fibers of the predetermined refractive index profile are provided, the MDC can be made by any appropriate process, e.g., using the polishing technique of the '350 patent, or possibly using a fusion and pulling technique similar to the known technique of making conventional fused fiber couplers. In either case, the fiber cores are disposed relatively close to each other, such that evanescent field coupling occurs. Appropriate choice of the fibers, the distance between the cores and of the effective coupling length results in the desired functionality, i.e., substantially total coupling of the higher order mode from one fiber to the other fiber, and substantially zero coupling of the fundamental mode from the one fiber to the other.

The above described MDC can be combined with other optical components (e.g., a further MDC, reflective or transmissive MCG) into devices of desired functionality, as will be described below. In preferred embodiments the reflective MCG is a reflective MCG of the type disclosed in the above referred to co-assigned patent application by T. A. Strasser.

Drop Multiplex Devices

Figure 3:
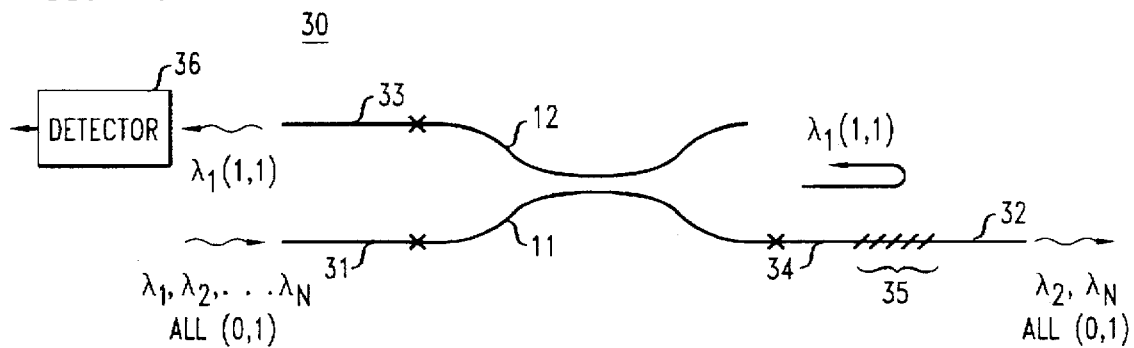
FIG. 3 shows an exemplary drop multiplexing device that comprises an MDC and an MCG.

FIG. 3 schematically illustrates the principle of the invention by means of an exemplary low loss drop multiplex device. Device 30 comprises an MDC as shown in FIG. 1. Fibers 31 and 32 are single mode fibers, fibers 33 and 34 are multimode fibers. WDM single mode (0,1) radiation ($\lambda_1, \lambda_2,$ . . . $\lambda_N$) propagates essentially unchanged through the coupling region to fiber 34, which comprises blazed refractive index grating 35. Radiation of a predetermined wavelength (e.g., $\lambda_1$) is reflected in a higher order spatial mode (e.g., (1,1)) by the grating. The (1,1) radiation is coupled into second fiber 12 and propagates towards and into fiber 33, where it is available for utilization, e.g., detection by conventional detector 36, exemplarily a wide area detector capable of collecting substantially all of the higher order mode radiation. At least in principle the grating 35 can be written into fiber 11 downstream of the coupling region (i.e., fiber 34 optionally is continuous with 11), but more typically fiber 34 is spliced to fiber 11.

The embodiment of FIG. 3 can be readily modified to provide the "dropped" channel $\lambda_1$ as (0,1) mode to the utilization means. This is accomplished by replacing multimode fiber 33 by a transmissive MCG that converts $\lambda_1$ (1,1) light to $\lambda_1$ (0,1) light. If desired, a length of single mode fiber is spliced to the output of the transmissive MCG, and the single mode fiber guides the dropped channel to the utilization means.

Figure 4:
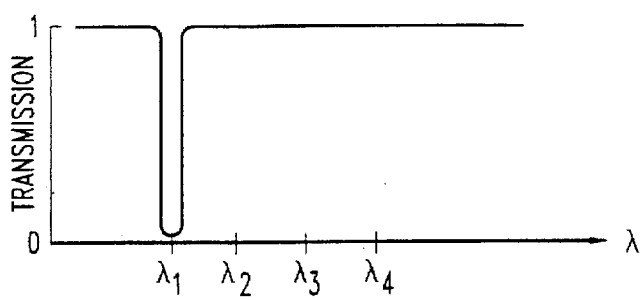
FIG. 4 schematically shows the transmission spectrum of the MCG of FIG. 3.

FIG. 4 shows schematically the transmission spectrum of the MCG of FIG. 3, for the exemplary case N=4.

Figure 5:
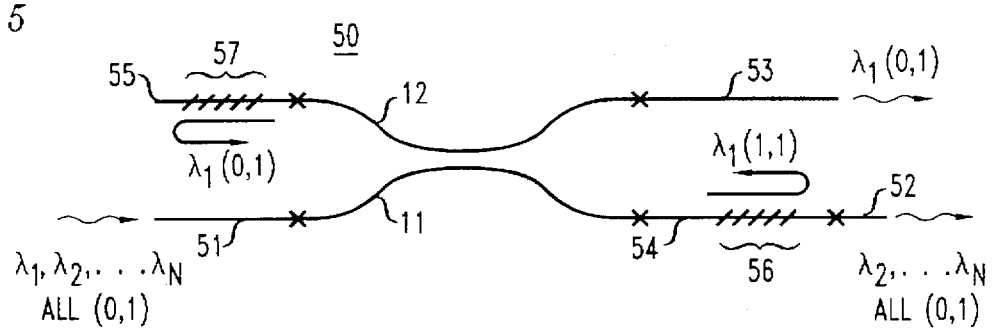
FIG. 5 schematically depicts an exemplary drop multiplexing device.

A further exemplary drop multiplex device 50 is shown schematically in FIG. 5. Fibers 51, 52 and 53 are single mode fibers, and fibers 11, 12, 54 and 55 are multimode fibers. WDM (0,1) radiation $\lambda_1, \lambda_2, \ldots \lambda_N$ propagates through fiber 51 to the MDC, with all wavelengths passing through the coupling region to fiber 54. Grating 56 is selected to pass all but one of the channels, reflecting the one channel (e.g., $\lambda_1$) in a higher order mode, e.g., (1,1). The higher order mode is coupled into fiber 12, travels in fiber 55 to grating 57, where it is reflected as (0,1) mode. The reflected $\lambda_1$ (0,1) radiation passes through the MDC in fiber 12 and is available for utilization, e.g., detection, from fiber 53.

Add Multiplex Device

Figure 6:
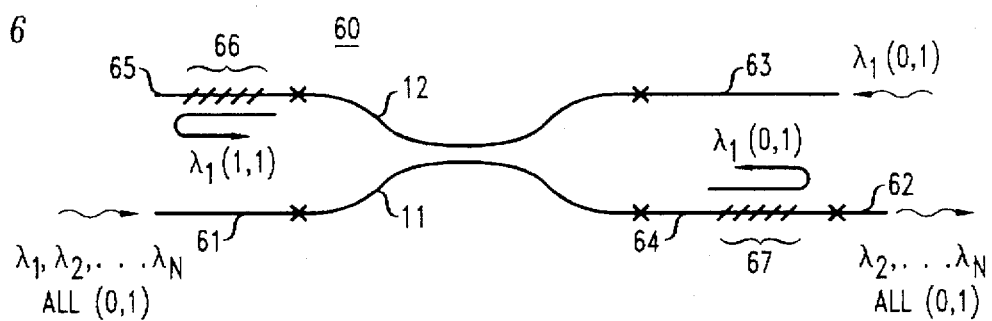
FIG. 6 schematically shows an exemplary add multiplexing device.

FIG. 6 schematically depicts an exemplary low loss add multiplex device 60. Fibers 61, 62 and 63 are single mode fibers, and fibers 11, 12, 64 and 65 are multimode fibers.

The channel that is to be added (e.g., $\lambda_1$ in the (0,1) spatial mode) propagates through fiber 63 to fiber 12 of the MDC and on to fiber 65. Grating 66 reflects $\lambda_1$ in a higher order spatial mode, typically (1,1), which is coupled into fiber 11, and propagates to grating 67 in fiber 64, where it is reflected in the (0,1) mode and propagates through fiber 11 to fiber 61. Channels $\lambda_2, \ldots \lambda_N$ (all (0,1)) propagate on fiber 62 to fiber 64 and, without mode conversion or significant attenuation, through grating 67 to fiber 11, and on to fiber 61, where channels $\lambda_1, \lambda_2, \ldots \lambda_N$ (all (0,1)) are available for utilization, e.g., transmission to the next node.

Add/Drop Multiplex Devices

Figure 7:
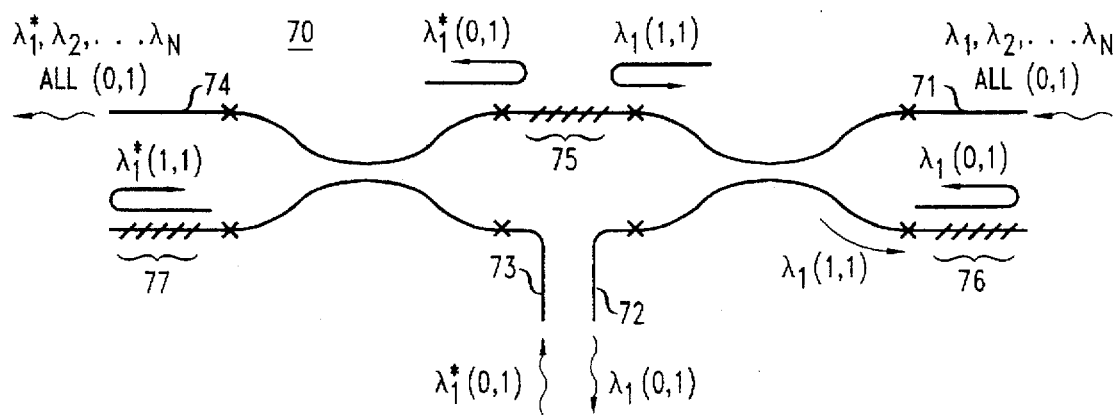
FIG. 7 schematically depicts an exemplary add/drop multiplexing device.

Two MDCs can be combined with MCGs to form an exemplary low loss add/drop multiplex device, as shown schematically in FIG. 7. Fibers 71, 72, 73 and 74 are single mode fibers, all other fibers are multimode. Channels $\lambda_1, \lambda_2$ . . . $\lambda_N$ (all (0,1)) enter the device on fiber 71, with channels $\lambda_2$ . . . $\lambda_N$ propagating through the device substantially without attenuation, to appear at fiber 74. The $\lambda_1$ radiation is reflected at grating 75 and transformed into (1,1). It propagates to grating 76, where it is reflected and transformed into (0,1) which propagates to fiber 72, where it is available for detection or other utilization.

Add channel $\lambda_1^*$ (0,1) propagates from fiber 73 to grating 77, where it is reflected in the (1,1) mode. The (1,1) radiation propagates to grating 75, where it is reflected and transformed to (0,1), which then propagates to fiber 74, where it is available for utilization, together with $\lambda_2$ . . . $\lambda_N$ (all as (0,1)). The add channel is designated $\lambda_1^*$, to indicate that the wavelength is the same as that of the drop channel, but that the information content is different.

Those skilled in the art will appreciate that the above described embodiments are exemplary only, and that the add, drop, or add/drop functionalities could also be attained by combining MDCs and MCGs differently. Furthermore, it will be understood that MDCs and MCGs can be combined to attain different functionalities, e.g., a power combiner, as will be shown below. Still furthermore, it will be appreciated that any channel can be added or dropped, and that reference to $\lambda_1$ as the dropped or added channel was purely for ease of exposition. It is also not necessary that (1,1) is the higher order mode involved in the mode coupling process. The mode could, for instance, be (0,2). Indeed, in principle it could be any higher order mode (m,n) although use of the lower higher order modes (m+n≤4) is typically preferred. It will also be appreciated that MDCs will typically comprise two dissimilar multimode fibers, that any fiber that has to carry higher order mode radiation has to be a multimode (typically dual mode) fiber, and that fibers that do not have to carry higher order mode radiation typically are single mode fibers.

Low Loss Power Combiners

Figure 8:
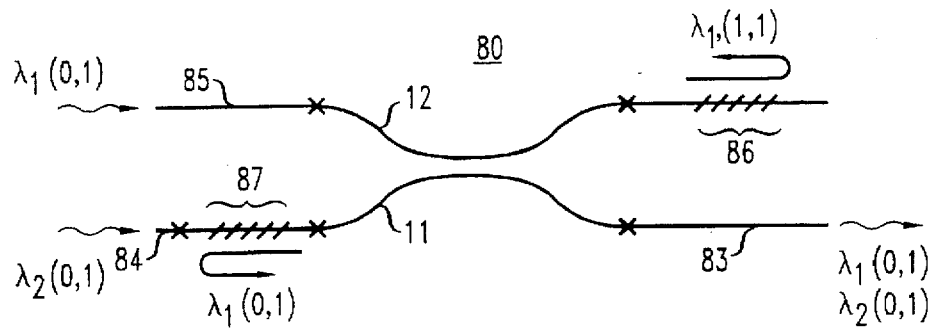
FIGS. 8 and 9 schematically show exemplary power combiners.

It is frequently desirable to combine the output of two or even three diode pump lasers to pump a high power fiber laser or amplifier. FIG. 8 schematically shows such a power combiner, with fibers 83, 84 and 85 being single mode fibers, and all other fibers being multimode fibers. $\lambda_1$ (0,1) radiation propagates through fiber 85 to fiber 12 and on to grating 86, where it is reflected in a higher order mode, typically (1,1). The radiation then is coupled into fiber 11, propagates to grating 87, where it is reflected in the (0,1) mode and propagates to fiber 83. $\lambda_2$ (0,1) radiation passes without mode transformation or substantial attenuation through grating 87 to fiber 11 and on to fiber 83, such that $\lambda_1$ (0,1) and $\lambda_2$ (0,1) are combined and available for utilization.

Figure 9:
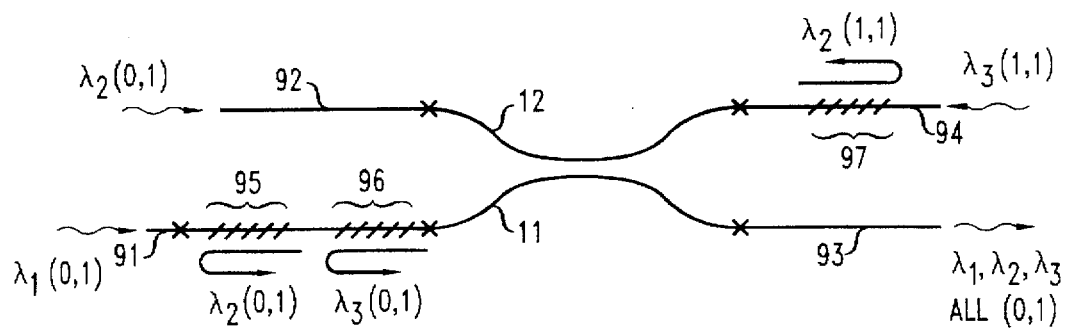

FIG. 9 schematically depicts an exemplary triple power combiner. Fibers 91, 92, 93 and 94 are single mode fibers, all others are multimode fibers. $\lambda_1$ (0,1) radiation propagates from fiber 91, through gratings 95 and 96, to output fiber 93. $\lambda_2$ (0,1) radiation propagates from fiber 92 to grating 97, is reflected as (1,1) mode, is coupled to fiber 11, propagates to grating 95, where it is reflected as (0,1) which propagates to fiber 93. $\lambda_3$ (1,1) propagates through grating 97, is coupled to fiber 11, propagates to grating 96 where it is reflected as (0,1) and propagates to fiber 93, where all three wavelengths are available as (0,1).

As shown above, one of the wavelengths (e.g., $\lambda_3$) has to be introduced as higher order mode (e.g., (1,1)). This is readily achieved, for instance by replacing fiber 94 with a transmissive MCG that transforms $\lambda_3$ (0,1) to $\lambda_3$ (1,1), or by using as $\lambda_3$ source a fiber laser whose output is (1,1).

Various variations of the power combiner are possible and are contemplated. For instance, $\lambda_1$ (0,1) can be replaced by WDM channels $\lambda_1 \ldots \lambda_N$, all (0,1), with the remaining two input ports receiving pump radiation, and with fiber 93 being a rare earth doped amplifier fiber.

Figure 10:
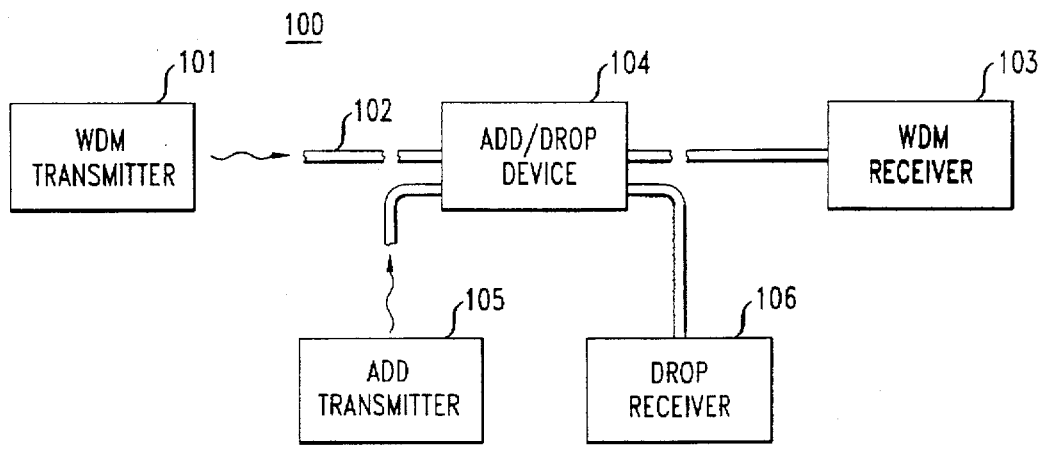
FIG. 10 schematically depicts an exemplary optical waveguide communication system according to the invention.

FIG. 10 schematically depicts an exemplary optical waveguide communication system 100 according to the invention. WDM transmitter 101 provides light of wavelengths $\lambda_1, \lambda_2 \ldots \lambda_N$, which is coupled into optical waveguide 102 and propagates towards WDM receiver 103. Between WDM transmitter and receiver is disposed add/drop device 104 according to the invention. A desired channel (e.g., $\lambda_1$) is de-multiplexed from the WDM transmission and received at drop receiver 16, and a desired channel (e.g., $\lambda_1^*$) is provided by add transmitter 105 and added to the WDM transmission, such that the WDM receiver receives channels $\lambda_1^*, \lambda_2 \ldots \lambda_N$.

EXAMPLE 1

A dual mode germano-alumino-silicate fiber with $\Delta n=0.044$ and cut-off wavelength 1750 nm was photosensitized by loading the fiber with 2.8 mol % molecular deuterium in conventional fashion. The fiber was exposed through a phase mask for 142 seconds to a 3 mm×0.6 mm FWHM Gaussian beam from an excimer-pumped, frequency-doubled dye laser. The laser output was 30 Hz at 242 nm, with a fluence of 25 mJ/pulse/cm$^2$, with the 3 mm beam dimension aligned with the axis of the fiber. The zero order-nulled phase mask had a period $\Lambda_o$ of 0.903 µm. The blaze angle is 6°15', and the resulting grating is a (0,1)/(1,1) reflective MCG at about 1340 nm, with essentially no (0,1)/(0,1) reflection at any wavelength within about 10 nm of that wavelength.

A first and a second dual mode optical fiber is provided. The fibers are selected to have essentially equal propagation constant $\beta_{11}$ at 1340 nm, and to have substantially different propagation constants $\beta_{01}$ at that wavelength. A portion of the cladding of each of the fibers is removed substantially as shown in U.S. Pat. No. 4,828,350, and the fibers are assembled such that they are evanescent field-coupled, also substantially as shown in the '350 patent. The coupling is selected such that essentially all $LP_{01}$ 1340 nm radiation propagates straight through the coupler, and such that essentially all $LP_{11}$ 1340 nm radiation is coupled from one fiber to the other fiber. The assembled fibers thus form a MDC.

The MDC and the MCG are combined substantially as shown in FIG. 3. The combination performs the drop function for a 1340 nm channel in a WDM optical communication system.

The invention claimed is:
1. An optical waveguide system comprising
 a) a source of first electromagnetic radiation of wavelength $\lambda_i$;
 b) utilization means for utilizing at least said first electromagnetic radiation;
 c) an optical waveguide path that optically connects said source to said utilization means, said optical waveguide path comprising a device combination disposed between said source and said utilization means, said device combination comprising
  i) a mode discriminating coupler and
  ii) reflective mode coupling means; CHARACTERIZED IN THAT
 d) the mode discriminating coupler is a 4-port coupler that comprises a first multimode optical waveguide coupled by evanescent field coupling to a second multimode optical waveguide that differs from the first multimode optical waveguide; said evanescent field coupling selected such that said electromagnetic radiation of wavelength $\lambda_i$ in a fundamental spatial mode propagates through the mode discriminating coupler on one of said two multimode optical waveguides, and electromagnetic radiation of wavelength $\lambda_i$ in a higher order spatial mode is coupled from said one of the multimode optical waveguides to the other of the multimode optical waveguides; and
 e) the reflective mode coupling means comprise a length of multimode optical waveguide comprising a reflective mode coupling grating having a blazed refractive index grating of pitch $\Lambda<1$ µm and blaze angle $\theta>3°$, with $\Lambda$ and $\theta$ selected such that said grating reflects said radiation of wavelength $\lambda_i$ in the fundamental spatial mode as radiation of wavelength $\lambda_i$ and higher order spatial mode, and furthermore selected that said grating does substantially not reflect radiation of wavelength $\lambda_j$, where both $\lambda_i$ and $\lambda_j$ are within a spectral range $\Delta\lambda \leq \lambda_i/100$.

2. System according to claim 1, further comprising a source of a second electromagnetic radiation of wavelength $\lambda_j$, said second electromagnetic radiation being coupled into said optical waveguide path, wherein said device combination is selected to demultiplex said first and second electromagnetic radiations.

3. System according to claim 1, further comprising a source of a second electromagnetic radiation of wavelength $\lambda_j$, wherein said device combination is selected to multiplex said first and second electromagnetic radiations on said optical waveguide path.

4. System according to claim 2, further comprising a source of a third electromagnetic radiation of wavelength $\lambda_k$, wherein said device combination is furthermore selected to multiplex said first and third electromagnetic radiations on said optical waveguide path.

5. System according to claim 4, wherein $\lambda_j$ is essentially equal to $\lambda_k$.

6. System according to claim 1, further comprising a source of a second electromagnetic radiation of wavelength $\lambda_j$, wherein said device combination is selected to combine said first and second electromagnetic radiations on said optical waveguide path, with said utilization means utilizing both the first and second electromagnetic radiations.

7. System according to claim 6, further comprising a source of a third electromagnetic radiation of wavelength $\lambda_k$, wherein said device combination is selected to combine said first, second and third electromagnetic radiations on said optical waveguide path, with said utilization means utilizing said first, second and third electromagnetic radiations.

8. System according to claim 1, wherein the optical waveguide path comprises single mode optical fiber.

9. System according to claim 1, wherein said device combination comprises a multiplicity of reflective mode coupling means, said reflective mode coupling means being reflective optical fiber refractive index gratings.

10. System according to claim 9, wherein said device combination further comprises a multiplicity of mode discriminating couplers, said mode discriminating couplers being optical fiber couplers.

11. System according to claim 10, wherein the fundamental spatial mode is the $LP_{01}$ mode, and the higher order spatial mode is the $LP_{11}$ mode.

12. System according to claim 6, wherein the utilization means comprise an optical waveguide amplifier.

13. System according to claim 7, wherein the utilization means comprise an optical waveguide amplifier.

* * * * *